United States Patent [19]

Brugel et al.

[11] 4,434,261

[45] Feb. 28, 1984

[54] EXTRUDABLE SELF-SUPPORTING HOT MELT ADHESIVE SHEET

[75] Inventors: Edward G. Brugel, Wilmington, Del.; Walter Yllo, Carneys Point, N.J.

[73] Assignee: E. I. Du Pont de Nemours and Company, Wilmington, Del.

[21] Appl. No.: 405,756

[22] Filed: Aug. 6, 1982

[51] Int. Cl.³ ............... C08K 5/01; C08K 5/09; C08K 5/11; C08K 5/20

[52] U.S. Cl. ............... 524/109; 156/327; 156/332; 156/334; 524/13; 524/15; 524/425; 524/435; 524/437; 524/445; 524/449; 524/451; 524/515; 524/522; 524/523; 524/524; 524/543; 524/556; 524/560; 524/561; 524/563; 524/564

[58] Field of Search ............... 524/109, 322, 13, 556, 524/563, 562; 156/327, 332, 334

[56] References Cited

U.S. PATENT DOCUMENTS

| | | | |
|---|---|---|---|
| 3,484,405 | 12/1969 | Seto | 524/515 |
| 4,160,751 | 7/1969 | Bock et al. | 524/322 |
| 4,174,325 | 11/1979 | Pischtschan et al. | 524/322 |
| 4,180,490 | 12/1979 | Maclean | 524/322 |
| 4,191,798 | 3/1980 | Schumacher | 428/95 |
| 4,219,453 | 8/1980 | Sakurai et al. | 524/322 |
| 4,222,924 | 9/1980 | Schumacher | 524/445 |
| 4,263,196 | 4/1981 | Schumacher | 524/423 |

FOREIGN PATENT DOCUMENTS 2067576  7/1981  United Kingdom .

OTHER PUBLICATIONS

Chemical Abstracts, vol. 93, No. 2, Jul. 14, 1980, Abstract No. 9388k.

Chemical Abstracts, vol. 93, No. 24, Dec. 15, 1980, Abstract No. 221599z.

*Primary Examiner*—Ronald W. Griffin

[57] ABSTRACT

Extrudable, self-supporting, nonblocking hot melt adhesive sheet is obtained by blending about 10–50% by weight of an ethylene interpolymer, such as ethylene/vinyl ester, ethylene/unsaturated mono- or dicarboxylic acids or esters of said unsaturated acids, etc.; 2–30% by weight of a plasticizer selected from the group consisting of processing oils, epoxidized oils, polyesters, polyethers, polyether esters and combinations thereof; about 20–80% by weight of filler; from 0 to about 10% by weight of at least one additive, such as organic acids, organic acid derivatives and surface active agents.

16 Claims, No Drawings

EXTRUDABLE SELF-SUPPORTING HOT MELT ADHESIVE SHEET

BACKGROUND OF THE INVENTION

1. Field of the Invention

This invention relates to hot melt adhesives and more specifically it relates to extrudable, self-supporting, nonblocking hot melt adhesive sheets.

2. Description of the Prior Art

Hot melt adhesives disclosed generally are premelted in a batch type vessel or continuously melted in an extrusion type device or a combination of the two i.e., melting in a batch vessel and metering in an extrusion pump. The molten hot melt is then applied to a cellulosic or plastic substrate. These are typically used in such fields as tapes and labels. Most often the sticky nature of the adhesive so applied requires the use of an antiblocking agent or release paper so that the sheet or tape can be unwound from a core or reel. This procedure is common for example in the use of hot melt pressure sensitive adhesives. In all cases the adhesive is applied as a molten fluid.

U.S. Pat. No. 4,191,798 discloses highly filled thermoplastic compositions useful as sound-deadening sheeting for automotive carpets consisting essentially of (a) from about 5–50% by weight of at least one copolymer of ethylene with at least one comonomer such as vinyl esters unsaturated carboxylic acid, unsaturated mono- or dicarboxylic acids, and esters of the unsaturated mono- or dicarboxylic acids; (b) from about 2–15% by weight of processing oil; and (c) from about 50–90% by weight of filler.

SUMMARY OF THE INVENTION

According to the present invention there is provided an extrudable self-supporting hot melt adhesive sheet which is non-adhesive at room temperature but is adhesive at about 150° F., is self-supporting at temperatures of about 200°–350° F. and has a melt index of from about 10 to about 500, said sheet comprising (a) from about 10 to about 50% by weight of at least one copolymer of ethylene with at least one comonomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, and esters of said unsaturated acids wherein the alcohol moiety has 1 to 8 carbon atoms, the ethylene content of said copolymer being from about 40 to about 95% by weight, the comonomer content of said copolymer being from about 5 to about 60% by weight, and the melt index of said copolymer being from about 0.1 to about 400, provided that when said copolymer of ethylene is an ethylene/vinyl ester or ethylene/unsaturated mono- or dicarboxylic acid ester copolymer said copolymer can contain up to about 15 percent by weight of carbon monoxide or sulfur dioxide; (b) from 2 to about 30 percent by weight of at least one plasticizer selected from the group consisting of processing oils, epoxidized oils, polyesters, polyethers, and polyether esters; (c) from about 20 to about 80% by weight of filler; (d) from 0 to about 10% by weight of at least one additive selected from the group consisting of organic acids, organic acid derivatives and surface active agents.

DETAILED DESCRIPTION OF THE INVENTION

It was discovered that the combination, in certain proportions, of ethylene interpolymers, processing oil and inert filler will result in a composition that is extrudable as a self-supporting (at the range of about 200°–350° F. die exit temperature) hot melt adhesive sheet which is nonblocking, i.e., nonadhesive at room temperature and adhesive at elevated temperatures, such as at about 150° F. This hot melt adhesive sheet can be laminated to other materials such as spun bonded polyester and spun bonded polypropylene.

The adhesive of the present invention is thermally preformed and requires no release or antiblocking agent. It can be applied as a cold solid in sheet or strip form as a backing or membrane between the adherends (substrates). It can then be heat activated in situ. Prior to the heat activation it can be manipulated, cut, or its shape can be mechanically altered to suit the geometric configuration of the adherends. On the other hand, conventional hot melt adhesives must be applied in molten form as a premelted hot fluid.

Melt index (M.I.) of the hot melt adhesive sheet of the present invention can range from about 10 to about 500, preferably from about 20 to about 200, and most preferably from about 40 to about 100.

Melt index is an important property because it determines the viscosity of the blend and thus affects its fluidity during extrusion. The proper amount of and selection of polymers of various molecular weight and plasticizer, as shown in the Example below, results in a blend with an M.I. in the most preferred range (40–100). The extruded self-supporting hot melt adhesive sheet exhibits a balance of properties such as good melt strength, elongation and unique adhesive properties.

The following are the physical property requirements for the hot melt adhesive sheet of the present invention:

Blend must produce a self-supporting hot melt adhesive sheet via extrusion or calendering.

Satisfactory adhesiveness at elevated temperatures, i.e., to provide satisfactory bonding to itself or other substrates when heated and to maintain the bond after cooling.

No adhesivity below 70° F.

No substantial oil or plasticizer exudation during processing and storage.

No deterioration of properties within a reasonable time, i.e., good "shelf life".

The sheeting will retain its adhesivity for a time interval after the heat source has been removed: a property known in adhesive terminology as "open time".

The ethylene copolymers suitable for the hot melt adhesive sheet of the present invention are copolymers with at least one comonomer selected from the group consisting of vinyl esters of saturated carboxylic acids wherein the acid moiety has up to 4 carbon atoms, unsaturated mono- or dicarboxylic acids of 3 to 5 carbon atoms, salts of said unsaturated acids and esters of said unsaturated mono- or dicarboxylic acids wherein the alcohol moiety has 1 to 8 carbon atoms. Terpolymers of ethylene and the above comonomers are also suitable. In addition, terpolymers of ethylene/vinyl acetate/carbon monoxide or ethylene/vinyl acetate/sulfur dioxide containing up to about 15 percent by weight of carbon monoxide or sulfur dioxide can also be employed.

The ethylene content of the copolymer is from about 40 to about 95% by weight, and the comonomer content is from about 5 to about 60% by weight. The preferred ethylene and comonomer level is from about 45 to about 91% and from about 9 to about 55% by weight, respectively. The most preferred ethylene and comonomer content is from about 88 to about 72% and from about 12 to about 28%, respectively. A mixture of two or more ethylene copolymers can be used in the blends of the present invention in place of a single copolymer as long as the average values for the comonomer content will be within the above indicated range.

Employing a copolymer containing over 28% nonethylenic comonomer (such as vinyl acetate) results in blends that are less stiff and have lower tensile strength, while their elongation is increased. The most preferred level is about 12 to 28 weight percent. Below 12% vinyl acetate, the blends become stiffer, elongation decreases, and oil compatability problems may arise.

Melt index of the copolymer can range from about 0.1 to about 600, preferably from about 0.1 to about 100. Physical properties, principally elongation, decline to lower levels when the ethylene copolymer melt index is above about 100. Lower melt index ranges, from about 1 to about 10, are most preferred to maintain strength. The melt index of the copolymer or combination of copolymers should be selected such that it would result in fully compounded adhesive melt index of from about 10 to about 500, preferably from about 20 to about 200, and most preferably from about 40 to about 100.

Generally from about 10 to about 50% by weight of ethylene copolymer is employed in the hot melt adhesive sheet of the present invention, preferably from about 20 to about 40% by weight, and most preferably from about 25 to about 35% by weight.

In accordance with the above, suitable ethylene copolymers are such as ethylene/vinyl acetate, ethylene/acrylic acid and its ionomers, ethylene/methacrylic acid and its ionomers, ethylene/methyl acrylate, ethylene/ethyl acrylate, ethylene/isobutyl acrylate, ethylene/normal butyl acrylate, ethylene/isobutyl acrylate/methacrylic acid and its ionomers, ethylene/normal butyl acrylate/methacrylic acid and its ionomers, ethylene/isobutyl acrylate/acrylic acid and its ionomers, ethylene/normal butyl acrylate/acrylic acid and its ionomers, ethylene/methyl methacrylate, ethylene/vinyl acetate/methacrylic acid and its ionomers, ethylene/vinyl acetate/acrylic acid and its ionomers, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl maleate and ethylene/methyl acrylate/monoethyl maleate.

Particularly suitable copolymers are ethylene/vinyl acetate, ethylene/methyl acrylate, ethylene/isobutyl acrylate, and ethylene/vinyl acetate/methacrylic acid.

The first group of plasticizer ingredient of the hot melt adhesive sheet of the present invention is known as process or processing oil. Three types of processing oils are known—paraffinic, aromatic and naphthenic. None of these is pure; the grades identify the major oil type present.

Processing oils are also subdivided by viscosity range. "Thin" oils can be as low as 100–500 SUS (Saybolt Universal Seconds) at 100° F. (38° C.). "Heavy" oils can be as high as 6000 SUS at 100° F. (38° C.). Processing oils, especially naphthenic and aromatic oils with viscosity of from about 100 to 6000 SUS at 100° F. (38° C.) are preferred.

The amount of plasticizer, such as the process oil, present in the sheet of the present invention is from 2 to about 30% by weight, preferably from about 8 to about 22% by weight. Most preferably the amount of processing oil is from about 12 to about 18% by weight.

In the selection of a process oil, other factors such as the type of oil selected and its viscosity must be considered. These are discussed in detail in U.S.P. 4,191,798, the disclosure of which is hereby incorporated by reference.

The second group of plasticizers that are effective in the practice of the present invention is the group comprising epoxidized oils such as epoxidized soybean oil and epoxidized linseed oil.

The third group of plasticizers that are effective are the polyesters, which, in general, are liquid condensation products of a polybasic acid and a polyol. The term "liquid" in the context of the present invention is used to mean pourable at room temperature. The acid component is most often a saturated aliphatic dibasic acid or an aromatic dibasic acid; adipic acid, azelaic acid, phthalic acid, sebacic acid, and glutaric acid, or mixtures thereof. The polyol can be an aliphatic polyol or a polyoxyalkylene polyol, such as ethylene glycol, propylene glycol, 1,4- and 1,3-butane glycol, diethylene glycol, and polyethylene glycol. Preferred polyester compositions would consist of an acid component of which greater than 50% by weight are aliphatic dibasic acids, and a polyol component of aliphatic polyol or even more preferably aliphatic glycol. Most preferred compositions are based on adipic or azelaic acid, and propylene glycol or 1,3- or 1,4-butane glycol. The molecular weight of these plasticizers can vary from a low of a few hundred up to a high of about 10,000. The molecular weight of commercial products is seldom specified. Typically in the trade, the molecular weight range of the product is classified as low, medium, or high. The preferred range for purposes of this invention is that classified as medium.

Mixtures of polyesters with hydrocarbon oils are also effective plasticizers in the present invention. One objective of using such a mixture is to couple the high efficiency of the relatively high cost polyester with the low cost of the hydrocarbon oil. The cost/performance of a compound plasticized with such a mixture can be improved significantly for a given application because properties can be tailored more precisely, or filler levels can be increased.

A separate class of plasticizers, polyethers and polyether esters, are also effective plasticizers in blends of the ethylene copolymers and fillers described above. In general, polyethers are oligomers or polymers of alkylene oxides; polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with an acid to form the ester. Fatty acids such as lauric and stearic acids are commonly used; the most common examples of these compounds are the mono- and diesters of polyethylene or polypropylene glycol.

The molecular weight of polyethers may range up to those typical of high polymers.

Preferred polyether compositions in the practice of this invention are those consisting of the polyols based on random and/or block copolymers of ethylene oxides and propylene oxides. The copolymer polyols provide better performance in terms of efficiency in compounds of the present invention containing very high levels of filler.

Mixtures of the polyether or the polyether ester plasticizers with either a polyester plasticizer or a hydrocarbon processing oil can also be used in the practice of this invention. The advantage of polyether/polyester combination is the lower cost since the polyethers are cheaper than the polyesters. Combinations of polyether and processing oil are also cheaper because of the lower cost of the oil.

The third essential ingredient of the sheet of the present invention is the filler. The percentage of filler that can be included on a weight basis is primarily a function of the density of the filler. Particle size and shape of the filler also will have an effect on properties of blends. Fine particle size fillers generally have a tendency to result in higher blend viscosities and they are also more expensive. No. 9 Whiting which has been used extensively in the present compositions (about 95% through 325 mesh) represents a viable midpoint in coarseness, availability, and cost. Most preferred fillers are calcium carbonate and barium sulfate. The amount of filler present in the composition of the present invention is from about 20 to about 80% by weight, preferably from about 40 to about 70% by weight. Most preferably the amount of filler is from about 50 to about 60% by weight.

In addition to the fillers mentioned above, incorporation of many oter types is, of course, possible without altering the fundamentals taught in this patent. For example, inclusion of alumina trihydrate (hydrated alumina—$Al_2O_3.3H_2O$) is highly desirable when flame-retardant or low-smoke-tendency sheets are desired. Heavy fillers, such as powdered iron or lead, or oxides of them, can be employed when ultra-dense sheets are desired. Similarly, minerals having low density, such as magnesium carbonate, calcium sulfate, silica, flyash, and cement dust, or organic fillers such as yarns, wood flour, wood fiber, nut shells, rice hulls etc., can be employed when light-density sheets are preferable. Finally, fillers with varied aspect ratios, such as talc, mica, from highly acicular (wollastonite, etc.) to round (glass beads, etc.) can also be employed to alter tensile strength/elongation relationships.

In addition to the above ingredients the hot melt adhesive sheet of the present invention may also contain additional additives to obtain certain characteristics. Among such additives one can list organic acids of the proper type. Organic acids cover a wide range of saturated acid types, from $C_6$ monobasic saturated carboxylic acids such as caproic to long-chain types such as $C_{22}$ (behenic) fatty acids are highly effective in enhancing elongation and in increasing melt index at very low concentrations. A concomitant decrease in blend stiffness is generally also attained. In addition to monomeric organic acids, the so-called "dimer" and "trimer" acids (dimers and trimers of the simpler straight-chain forms) having up to 54 carbon atoms are also highly effective. Mixtures of the above mentioned acids may be employed, as may mixtures of any of the acid types disclosed herein.

In addition to the acids listed above, saturated polybasic acids are also effective. In this instance, when an acid such as azelaic acid ($C_9$, saturated, dibasic; $HOOC.(CH_2)_7.COOH$) is employed, the elongation values for blends will be markedly improved, the stiffness will be reduced, but the melt index will be virtually unchanged. Thus, the compounder is afforded an added tool for securing a desired balance of properties.

Further, mono- or polyunsaturated organic acids, including the $C_{12}$–$C_{20}$ mono- and dicarboxylic acids, and, in particular, oleic acid (monounsaturated $C_{18}$-type fatty acid) are also highly effective.

Cyclic organic acid "analogs" of the fatty acids are also effective in the practice of this invention. Both alicyclic (i.e, saturated) and aromatic (unsaturated, benzene-related ring structures with carboxylic group) were found to be effective. However, the common acids of this type may often be acrid and of doubtful thermal stability; hence, care must be taken in their selection and conditions of use.

Mono-, di- and trivalent metal salts of organic acids, in particular the calcium and zinc salts of fatty acids, are very effective. Esters and amides of the organic acids are also effective.

The number of organic acids in existence is enormous; the examples named above can be replaced by other close analogs with good results and without departing from the spirit of this invention.

A more detailed description of the organic acids that are suitable for use in the present invention can be found in copending patent application Ser. No. 339,468, filed on Jan. 15, 1982, the disclosure of which is hereby incorporated by reference.

Another group of additives that can be employed in the hot melt adhesive sheet of the present invention are surface active agents of the proper type. These will produce a large increase in the tensile elongation value of the hot melt adhesive sheet.

Surfactants which are effective are those which are selected from the group consisting of alkanol amides; betaine derivatives; block copolymers comprising a series of condensates of ethylene oxide with hydrophobic bases formed by condensing propylene oxide with propylene glycol; ethoxylated compounds comprising alcohols, alkyl phenols, amines and amides; sulfonated derivatives comprising alkyl sulfonates, aryl sulfonates, alkyl-aryl sulfonates, amine and amide sulfonates, olefin sulfonates, sulfosuccinates, sulfonated fatty acid esters, sulfonates of ethoxylated alkyl phenols and of oils and of fatty acids, naphthalene and alkyl naphthalene sulfonates, condensed naphthalene sulfonates, naphthalene and alkyl naphthalene sulfonates and petroleum sulfonates, and dodecyl and tridecyl benzene sulfonates; dodecyl and tridecyl sulfonic acids; sulfates of alcohols, of ethoxylated alcohols, of ethoxylated alkyl phenols, of oils, of fatty acids, of fatty esters, alkaryl sulfates, and sodium, ammonium and amine salts thereof; phosphate derivatives comprising phosphate esters, phosphate alcohol ethoxylates, phosphate ether ethoxylates, phosphate alkyl acids and phosphate alkyl quaternaries; and quaternary surfactants.

The number of surfactants in existence is enormous; the examples named above can be replaced by other close analogs with good results and without departing from the spirit of this invention.

A more detailed description of the surface active agents suitable for use can be found in copending patent application Ser. No. 400,243, filed July 19, 1982, the disclosure of which is hereby incorporated by reference.

The amount of the additive, such as the organic acid or surfactant will generally range from 0 to about 10% by weight.

Polymers, both homo- and copolymers, other than the ones referred to above, can also be used to some extent in combination with the above specified polymers without significantly interfering with the advantages obtained by the present invention. These include, but without limitation, polymers such as ethylene/carbon monoxide and ethylene/sulfur dioxide. As a further example, from 0 to about 48% by weight of olefin polymer selected from the group consisting of low density branched polyethylene, high density linear polyethylene, linear copolymers of ethylene and another olefin comonomer, polypropylene, polyisobutylene and copolymers of propylene and ethylene where the ethylene content is up to 20% by weight can be included in the hot melt adhesives of the present invention. Similarly other ingredients can also be added to the compositions of the present invention by a compounder in order to obtain some desired effect, such as reduction of cost, or enhancement of a physical property. Accordingly, extender resins, waxes, foaming agents, crosslinking agents, antioxidants, elastomers, tackifiers etc. that are widely used, particularly in hot melts, can be included in the sheets of the present invention.

A commercially sized batch-type Banbury or equivalent intensive mixer is entirely suitable for preparing the compositions of the present invention. A Farrel continuous mixer ("FCM") is also an excellent mixing device as is a twin-screw extruder. In either instance, dry ingredients are charged in routine fashion. It is convenient in most cases to inject the plasticizer component directly into the mixing chamber of either unit as per widely used practice with this type of equipment. When more than one plasticizer is used, and where any one of the plasticizers is present in a small amount (less than about 10 weight percent of the total plasticizer mixture), the plasticizers should be preblended before addition to the other ingredients of the present invention. This will facilitate uniform distribution of each plasticizer component in the final composition and thus ensure that optimum properties are obtained. Similarly, since the amounts of organic acid employed generally is so small, less than 1% for many cases, it is important to be certain that the organic acid is thoroughly mixed into the final blend. If this is not done, highly erratic values for physical properties may result. Thus, it may often prove helpful to premix the organic acid into a portion of one of the other ingredients, e.g., a liquid organic acid may be premixed with the process oil or a solid organic acid may be premixed with an aliquot of the filler. If desired, the copolymer and the plasticizer(s) can be precompounded as a "Masterbatch" in a suitable intensive mixing device (e.g., Banbury mixer or screw extruder). This "Masterbatch" can then be compounded with the filler and the other remaining ingredients to produce the final composition. A mix cycle of about 3 minutes is generally adequate for the Banbury mixer at an operating temperature usually between 325° and 375° F. The operating rate for the FCM unit generally will fall within ranges predicted by literature prepared by the Farrel Company, Ansonia, Conn. Here, temperatures between 325° and 425° F. are effective. In both cases, a very low plasticizer level, say about 2-3%, may require higher temperatures, while plasticizer levels above about 7% may mix well at lower mixer temperatures. While not evaluated, it is expected that other devices for handling viscous mixed (MI of 0.1 to 50) should be entirely satisfactory—but in many case, prototype trials in advance are desirable.

Generally, changes in the sequence of addition of ingredients has not been found to be significant, provided that the final mixture is thoroughly fluxed to attain homogeneity.

Once blends are mixed, routine commercial practices may be used, such as underwater melt cutting plus drying or use of sheeting plus chopping methods, to produce a final pelletized product. Alternately, the hot mixture also may be immediately fabricated into a final form, e.g. sheeting, molding, etc.

Primary use for the compositions of the present invention will be as a hot melt adhesive sheet. For example, a narrow strip of the composition of the present invention (say b 3-4" wide by 25 mils thickness), which is nonadhesive at ordinary temperatures, can be placed between the overlapped edges of two larger sheets. The overlap can be equal to the width of the hot melt adhesive strip. Sufficient heat is then applied to the surface of the topmost layer to uniformly raise the temperature of the inner hot melt adhesive strip. In certain instances, pressure may be applied after the heat source is removed. The result is a sealed seam between the two larger sheets.

The example which follows is given for the purpose of illustrating the present invention. All parts and percentages are by weight unless otherwise specified.

EXAMPLE

A blend of
- 9.0% EVA No. 1 (74% ethylene, 25% vinyl acetate, 1% methacrylic acid terpolymer, 500 M.I. Available from E. I. du Pont de Nemours and Company)
- 21.0% EVA No. 2 (71% ethylene, 28% vinyl acetate, 1% methacrylic acid terpolymer, 6 M.I. Available from E. I. du Pont de Nemours and Company)
- 55.0% #9 Whiting (calcium carbonate ex. Georgia Marble Company)
- 15.0% "Circosol" 4240-A naphthenic process oil, ex Sun Oil Company, ASTM type 103; 2525 SUS at 100° F.; approximate composition is $C_A=21\%$ (aromatic); $C_N=39\%$ (naphthenic); $C_P=40\%$ (paraffinic)

was prepared by premixing all ingredients (1625 g) in a one-gallon can by shaking manually for about 0.5 minutes. The blend was then charged to a Banbury-Type Laboratory-sized intensive high-shear mixer. Mix conditions used were fluxing for 3 minutes at a temperature of about 325°-375° F. (about 160°-190° C.).

In this instance the blend was discharged from the Banbury Mixer and was fed to a single screw extruder and was under water melt cut and pelletized. Subsequently the pellets were fed to a single screw extruder which was equipped with a sheeting die. The original purpose of the extrusion of this material was to extrusion coat a fabric substrate with a composition which would act as an adhesive when later activated by heat. The art teaches the application of a hot melt adhesive to a substrate which could be activated at a later time. Our approach was to use a filled hot melt adhesive. In order to get the desired adhesive properties, we had to have a composition with a high melt index (say 50 to 100 g/10 min.). To one familiar with extrusion of polymer films, it would not be expected that a composition with a melt index of 50 to 100 could be extruded into a sheet. Most likely, the polymer would break off soon after exiting the sheet die. Thus, our plans were to coat our composition on to the fabric substrate without ever attempting to go through (to) a sheet form.

At the initial coating experiments at from 375° to 400° F., the composition was very fluid and left the adhesive coating too tacky as it passed through the nip rolls. Thus, we began to lower the melt temperature and at about 275° F. we began to notice that the sheet was increasing in strength as it exited the die. At from 230° to 240° F. the sheet became totally self-supporting, and we processed it through the chill rolls to obtain a self-supported hot melt adhesive sheet having a thickness of about 25 mils.

This sheet exhibited excellent adhesivity (stickiness-tack) at about 150° F. After cooling, it was nonadhesive and easily unrolled after storage.

Adhesivity of the 25 mil thick self-supporting sheet, was determined as follows. The sheet was cut into strips 1"×6". Two strips were placed in an oven, one on top of the other, and a thermocouple placed in between the strips. A pressure of 0.1 psi was applied to the top surface. The oven temperature was varied and the strips removed at the desired test temperature. The strips were allowed to cool to room temperature, and an Instron Tester (according to ASTM D-1876) was used to measure the peel strength of the bond.

When the sheet of the present example was tested in this manner, the following results were obtained. At 100° F. and 125° F. the two strips easily separated indicating no adhesive bond had formed. At 150° F. a complete bond was formed as shown by non-bond failure at 250 psi.

Other properties obtained are summarized below:

| Tensile Strength[1] | psi | 285 |
|---|---|---|
| | kPa | 1965 |
| Elongation[1], % | | 548 |
| M.I.[2] | | 76 |
| Specific Gravity[3] g/cc | | 1.51 |
| Stiffness[4] of strip, (g) | | 17 |
| Oil Exudation[5] | | None |

[1]Tensile strength and elongation measurements made on Instron Tester using ASTM Method D1708 at crosshead speed of 2 in. (5.1 cm)/min. Samples are 0.876 in. (2.23 cm) × 0.187 in. (0.47 cm) in size, at strip thickness shown in table.
[2]ASTM D1238, Procedure A, Condition E; units are dg/min.
[3]Referred to water.
[4]Stiffness of strip was measured by placing a 1 in. × 6 in. (2.54 cm × 15.2 cm) strip on a platform scale, and measuring the force required to make the ends of the test strip meet, at room temperature.
[5]Oil exudation was determined by observation of smooth pressed sheet made with high surface sheen as would be produced in industry by conventional combination of an extruder plus a set of polished finishing rolls. The sheet was stored in a CTCH room (constant temperature, constant humidity: 78° F./50% R.H.) and inspected over a period of time for oil exudation to the surface.

| Oil Exudation Rating For Compositions | | | |
|---|---|---|---|
| Rating | Visual | Tactile | Absorption On Paper |
| None | No visible change | Feels dry | No transfer to paper |
| Very Slight | No visible change | Dry | Smallest perceptible oil traces on paper |
| Slight | No visible change | Borderline | Oil transfer to paper is easily noticed. |
| Moderate | Surface gloss changes noted-may look "wet" | Slippery feel but no visible transfer to fingers sample area | Paper beneath sample is definitely wet-under entire |
| Heavy | Wet film readily noticed-oil droplets may be visible | Heavy film exists-which streaks when rubbed. Finger feels oily after test. | sample area Paper is thoroughly wetted. Oil wicks well beyond the area in contact with the test strip. |

We claim:

1. An extrudable self-supporting hot melt adhesive sheet which is nonadhesive at room temperature but is adhesive at about 150° F., is self-supporting at about 200°–350° F. and has a melt index of from about 10 to about 500, said sheet comprising (a) from about 10 to about 50% by weight of at least one copolymer of ethylene with at least one comonomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, and esters of said unsaturated acids wherein the alcohol moiety has 1 to 8 carbon atoms, the ethylene content of said copolymer being from about 40 to about 95% by weight, the comonomer content of said copolymer being from about 5 to about 60% by weight, and the melt index of said copolymer or combination of copolymers being such that would result in a melt index of from about 10 to about 500 for the fully compounded adhesive, provided that when said copolymer of ethylene is an ethylene/vinyl ester or ethylene/unsaturated mono- or dicarboxylic acid ester copolymer said copolymer can contain up to about 15 percent by weight of carbon monoxide or sulfur dioxide; (b) from 2 to about 30 percent by weight of at least one plasticizer selected from the group consisting of processing oils, epoxidized oils, polyesters, polyethers, and polyether esters; (c) from about 20 to about 80% by weight of filler; (d) from 0 to about 10% by weight of at least one additive selected from the group consisting of organic acids, organic acid derivatives and surface active agents.

2. The hot melt adhesive sheet of claim 1 having a melt index of from about 20 to about 200 wherein (a) said copolymer of ethylene is present in an amount of from about 30 to about 40 percent by weight, the ethylene content of said copolymer being from about 45 to about 91% by weight, the comonomer content of said copolymer being from about 9 to about 55 percent by weight and the melt index of said copolymer or combination of copolymers being such that would result in a melt index of from about 20 to about 200 for the fully compounded adhesive; (b) said plasticizer is present in an amount of from about 10 to about 20 percent by weight; (c) said filler is present in an amount of from about 40 to about 70 percent by weight.

3. The hot melt adhesive sheet of claim 2 wherein said filler is selected from the group consisting of calcium carbonate, barium sulfate, hydrated alumina, clay, magnesium carbonate, calcium sulfate, silica, iron, lead, or oxides thereof, mica, talc and wollastonite, flyash, cement dust, yarns, wood flour, wood fiber, nut shells, ground rice hulls and mixtures thereof.

4. The hot melt adhesive sheet of claim 3 wherein said copolymer of ethylene is selected from the group consisting of ethylene/vinyl acetate, ethylene/acrylic acid and its ionomers, ethylene/methacrylic acid and its ionomers, ethylene/methyl acrylate, ethylene/ethyl acrylate, ethylene/isobutyl acrylate, ethylene/normal butyl acrylate, ethylene/isobutyl acrylate/methacrylic acid and its ionomers, ethylene/normal butyl acrylate/methacrylic acid and its ionomers, ethylene/isobutyl acrylate/acrylic acid and its ionomers, ethylene/normal butyl acrylate/acrylic acid and its ionomers, ethylene/methyl methacrylate, ethylene/vinyl acetate/methacrylic acid and its ionomers, ethylene/vinyl acetate/acrylic acid and its ionomers, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl maleate and ethylene/methyl acrylate/monoethyl maleate.

5. The hot melt adhesive sheet of claim 4, having a melt index of from about 40 to about 100 wherein (a) said copolymer of ethylene is present in an amount of from about 25 to about 35 percent by weight; the ethylene content of said copolymer being from about 72 to about 88 percent by weight, the comonomer content of said copolymer being from about 12 to about 28 percent by weight, and the melt index of said copolymer or combination of copolymers being such that would result in a melt index of from about 40 to about 100 for the fully compounded adhesive; (b) said plasticizer is present in an amount of from about 12 to about 18 percent by weight; (c) said filler is present in an amount of from about 50 to about 60 percent by weight.

6. The hot melt adhesive sheet of claim 5 wherein said filler is selected from the group consisting of calcium carbonate, barium sulfate, hydrated alumina, and mixtures thereof.

7. The hot melt adhesive sheet of claim 6 wherein said copolymer of ethylene is selected from the group consisting of ethylene/vinyl acetate, ethylene/methyl acrylate, ethylene/isobutyl acrylate, and ethylene/vinyl acetate/methacrylic acid.

8. The hot melt adhesive sheet of claim 1 wherein said copolymer of ethylene is a terpolymer.

9. The hot melt adhesive sheet of claim 8 wherein at least one monomer of said terpolymer is selected from the group consisting of unsaturated monocarboxylic acids of 3 to 5 carbon atoms.

10. The hot melt adhesive sheet of claim 9 wherein at least one monomer of said terpolymer is selected from the group consisting of acrylic acid and methacrylic acid.

11. The hot melt adhesive sheet of claim 10 wherein said terpolymer is selected from the group consisting of ethylene/vinyl acetate/methacrylic acid and ethylene/vinyl acetate/acrylic acid.

12. The hot melt adhesive sheet of claim 8 wherein one of the monomers of said terpolymer is carbon monoxide.

13. The hot melt adhesive sheet of claim 12 wherein said terpolymer is selected from the group consisting of ethylene/vinyl acetate/carbon monoxide and ethylene/normal butyl acrylate/carbon monoxide.

14. The hot melt adhesive sheet of claims 1, 8, 9, 10, 11, 12 or 13 wherein said copolymer is a mixture of two or more ethylene copolymers.

15. The hot melt adhesive sheet of claim 11 wherein said terpolymer is a mixture of ($\alpha$) an about 74/25/1 terpolymer of ethylene/vinyl acetate/methacrylic acid having a melt index of about 500 and ($\beta$) and an about 71/28/1 terpolymer of ethylene/vinyl acetate/methacrylic acid having a melt index of about 6.

16. The hot melt adhesive sheet of claim 15 wherein terpolymer ($\alpha$) is present in an amount of about 9% by weight and terpolymer ($\beta$) is present in an amount of about 21% by weight.

* * * * *